(12) United States Patent
Okuzono

(10) Patent No.: US 11,995,362 B2
(45) Date of Patent: May 28, 2024

(54) IMAGE FORMING APPARATUS COMMUNICABLE WITH PLURAL REMOTE OPERATION DEVICES, AT LEAST ONE OF WHICH IS ABLE TO SHUT DOWN THE IMAGE FORMING APPARATUS

(71) Applicant: CANON KABUSHIKI KAISHA, Tokyo (JP)

(72) Inventor: Ryotaro Okuzono, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/163,987

(22) Filed: Feb. 3, 2023

(65) Prior Publication Data
US 2023/0259314 A1   Aug. 17, 2023

(30) Foreign Application Priority Data

Feb. 14, 2022 (JP) ................. 2022-020676

(51) Int. Cl.
*G06F 3/12* (2006.01)
(52) U.S. Cl.
CPC .......... *G06F 3/1229* (2013.01); *G06F 3/1203* (2013.01); *G06F 3/1285* (2013.01); *G06F 3/1292* (2013.01)

(58) Field of Classification Search
CPC ........................................ G06F 3/1203–1292
See application file for complete search history.

(56) References Cited

U.S. PATENT DOCUMENTS

| 6,509,975 B1* | 1/2003 | Motegi ................. G06F 3/1285 358/1.14 |
| 10,908,853 B2* | 2/2021 | Nakahara .............. G06F 3/1229 |
| 11,553,100 B2* | 1/2023 | Sasagawa .......... H04N 1/00928 |
| 2006/0080423 A1* | 4/2006 | Brewer .................. G06K 15/00 709/223 |
| 2013/0182272 A1* | 7/2013 | Lim ...................... G06F 3/1229 358/1.14 |

FOREIGN PATENT DOCUMENTS

| JP | 2004199477 A | * | 7/2004 |
| JP | 2020107352 A | | 7/2020 |

* cited by examiner

*Primary Examiner* — Barbara D Reinier
(74) *Attorney, Agent, or Firm* — ROSSI, KIMMS & McDOWELL LLP

(57) ABSTRACT

Disclosed is an image forming apparatus including at least one processor configured not to shut down the image forming apparatus when a reply not permitting shutdown of the image forming apparatus is included in replies from remote operation devices other than the remote operation device that has transmitted a shutdown instruction among a plurality of the remote operation devices.

7 Claims, 12 Drawing Sheets

IMAGE FORMING APPARATUS COMMUNICABLE WITH PLURAL REMOTE OPERATION DEVICES, AT LEAST ONE OF WHICH IS ABLE TO SHUT DOWN THE IMAGE FORMING APPARATUS

BACKGROUND OF THE INVENTION

Field of the Invention

The present invention relates to an image forming apparatus wirelessly connected to a plurality of remote operation devices and remotely operated by the remote operation devices to print an image on a recording medium.

Description of the Related Art

In recent years, there is a technology referred to as a remote user interface (hereinafter, the same is described as a "remote UI"), configured to connect a user terminal such as a notebook computer or a tablet to an image forming apparatus and to allow a user to operate the image forming apparatus from a remote place using the user terminal. In the remote UI, an operation screen generated by a controller of a main body of the image forming apparatus is displayed on the user terminal via a network installed in an office environment of the user, thereby enabling the user terminal to operate the image forming apparatus at a remote place.

In addition, as a similar image forming system that can be remotely operated, a system has been proposed in which an operation portion of an image forming apparatus that has been conventionally connected by wire is replaced with wireless communication.

In such a situation, Japanese Patent Application Laid-Open No. 2020-107352 proposes a system in which shutdown processing is executed from a user terminal on a network instead of manually executing termination processing on an image forming apparatus.

However, Japanese Patent Application Laid-Open No. 2020-107352 does not assume that a plurality of user terminals or a plurality of operation portions capable of performing wireless communication is connected. Therefore, in Japanese Patent Application Laid-Open No. 2020-107352, in a case where the plurality of user terminals or the plurality of operation portions is connected, there is a possibility that shutdown processing is remotely executed by another user terminal or operation portion even while the image forming apparatus is being operated by the user terminal or the operation portion. In particular, an image forming apparatus configured to perform commercial printing has a problem in that once execution of shutdown processing is started, the shutdown processing may take up to about one hour due to exhaust processing or the like, and it takes a long time until the image forming apparatus becomes usable again, thereby impairing user convenience.

SUMMARY OF THE INVENTION

It is desirable to provide an image forming apparatus capable of being remotely operated by a plurality of remote operation devices and preventing in advance shutdown processing by another remote operation device during use of the image forming apparatus.

An image forming apparatus according to the present invention is an image forming apparatus wirelessly connected to a plurality of remote operation devices configured to remotely perform an operation related to execution of image formation, the image forming apparatus including a communication portion configured to wirelessly communicate with the plurality of remote operation devices, and at least one processor configured to transmit, when the communication portion receives a shutdown instruction, which is an instruction to shut down the image forming apparatus, from the remote operation device in a state where the plurality of remote operation devices is wirelessly connected to use the image forming apparatus, a shutdown inquiry notification of inquiring whether shutdown of the image forming apparatus is executable to all the remote operation devices other than the remote operation device that has transmitted the shutdown instruction among the plurality of remote operation devices, and to receive a reply to the shutdown inquiry notification, in which the at least one processor does not shut down the image forming apparatus when a reply not permitting the shutdown of the image forming apparatus is included in the replies from the remote operation devices other than the remote operation device that has transmitted the shutdown instruction among the plurality of remote operation devices.

Further features of the present invention will become apparent from the following description of exemplary embodiments (with reference to the attached drawings).

DESCRIPTION OF THE EMBODIMENTS

Hereinafter, embodiments will be described in detail with reference to the drawings.

<Configuration of Image Forming System>

A configuration of an image forming system 100a according to an embodiment of the present invention will be described in detail with reference to FIG. 1.

Figure 1A:
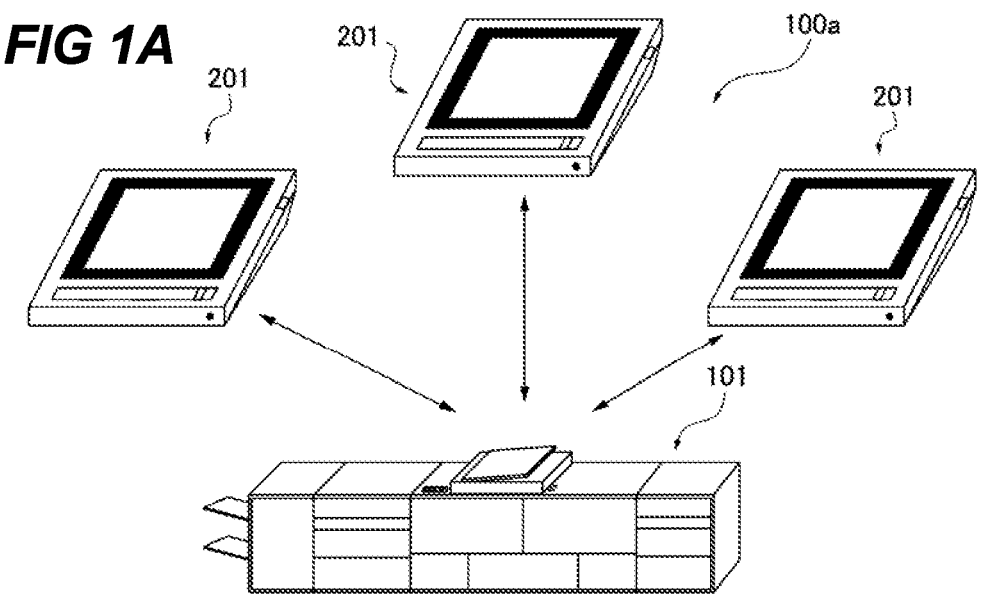
FIGS. 1A and 1B are schematic diagrams of an image forming system according to an embodiment of the present invention.
Figure 1B:
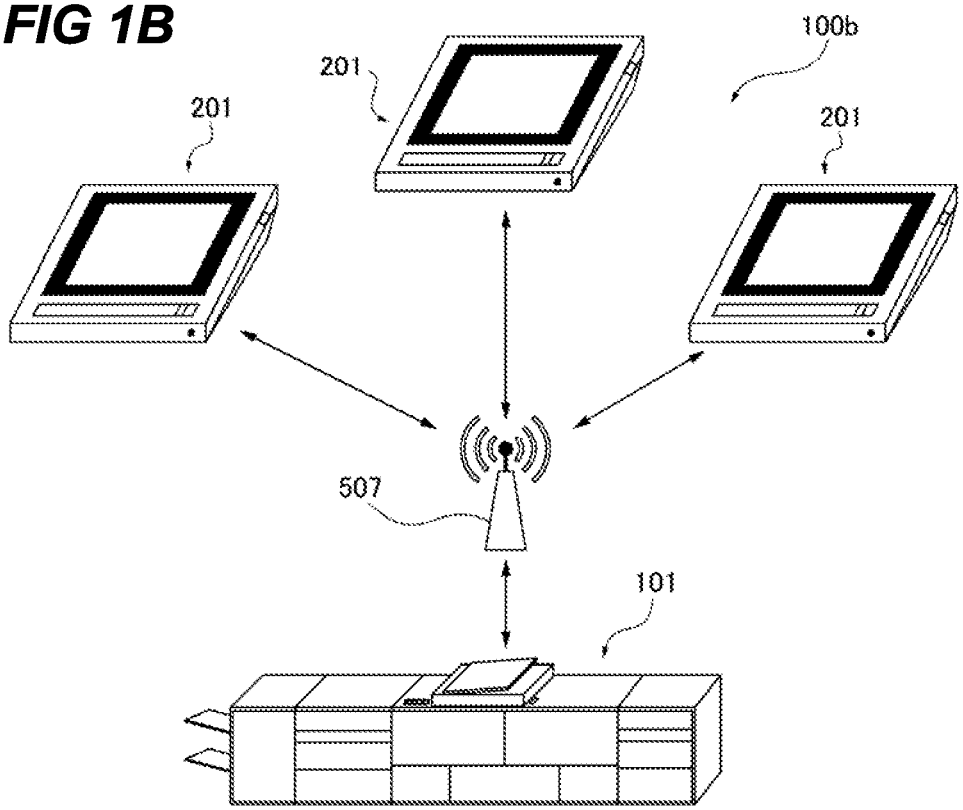

In FIG. 1, FIG. 1A illustrates a configuration of the image forming system 100a, and FIG. 1B illustrates a configuration of an image forming system 100b, the configuration of which is different from that of the image forming system 100a.

The image forming system 100a includes an image forming apparatus 101 and a plurality of remote operation devices 201.

The image forming apparatus 101 is remotely operated by the remote operation devices 201 to print an image on a recording medium. The image forming apparatus 101 has an access point function.

Each of the plurality of remote operation devices 201 can be wirelessly connected to the image forming apparatus 101. WiFi is a typical technique for wirelessly connecting the image forming apparatus 101 to the remote operation device 201. When an operation instruction is input by a user, the remote operation device 201 wirelessly transmits an electric signal corresponding to the input operation instruction to the image forming apparatus 101, and causes the image forming apparatus 101 to perform the operation instructed by the user. Since there is no cable connection, the remote operation device 201 is freely carried by the user.

Here, the configuration of the image forming system is not limited to the configuration of the image forming system 1a illustrated in FIG. 1A, and may be the configuration of the image forming system 1b illustrated in FIG. 1B.

The image forming system 100b illustrated in FIG. 1B includes an image forming apparatus 101, a plurality of remote operation devices 201, and an access point 507.

It is noted that, in FIG. 1B, parts having the same configurations as those in FIG. 1A are denoted by the same reference numerals, and a description thereof is omitted.

The access point 507 can be wirelessly connected to the image forming apparatus 101 and the remote operation device 201.

The image forming apparatus 101 can be wirelessly connected to each of the remote operation devices 201 via the access point 507. The image forming apparatus 101 does not have an access point function.

<Configuration of Image Forming Apparatus>

Figure 2:
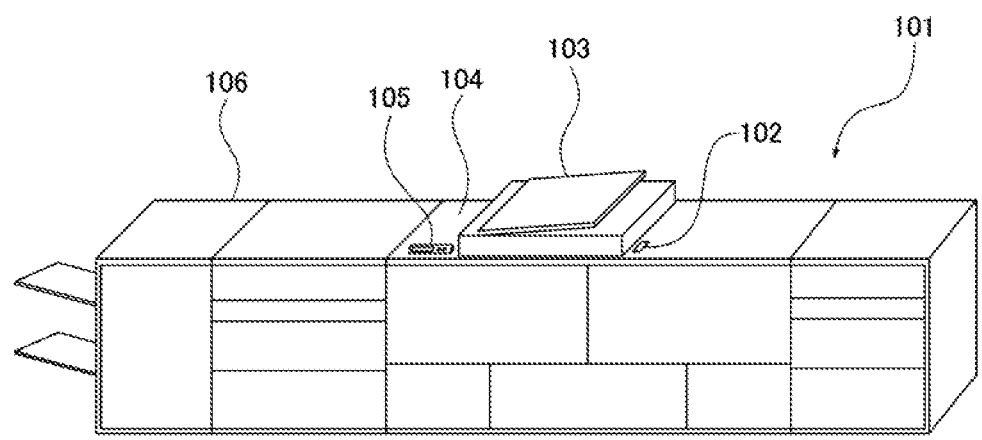
FIG. 2 is a perspective view of an image forming apparatus according to the embodiment of the present invention.
Figure 3:
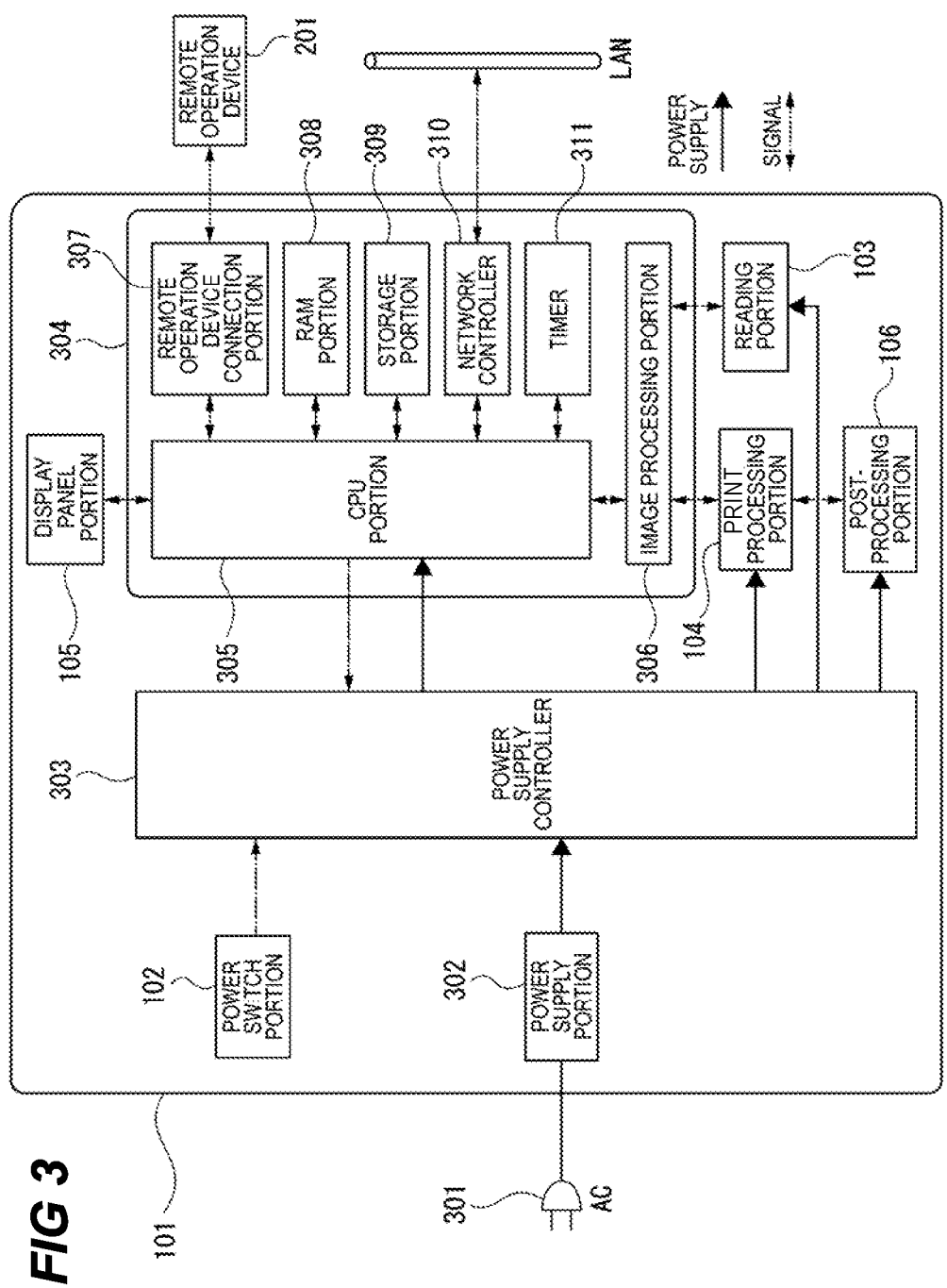
FIG. 3 is a block diagram illustrating a configuration of the image forming apparatus according to the embodiment of the present invention.

A configuration of the image forming apparatus 101 according to the embodiment of the present invention will be described in detail with reference to FIGS. 2 and 3.

Here, the image forming apparatus 101 is exemplified by a multifunction peripheral having various functions such as a copy function, a scan function, and a print function. Specifically, the image forming apparatus 101 includes a power switch portion 102, a reading portion 103, a print processing portion 104, a display panel portion 105, a post-processing portion 106, an AC plug 301, a power supply portion 302, a power supply controller 303, and a controller 304.

The power switch portion 102 is a switch that turns on or off the power of the image forming apparatus 101, and is a seesaw-type switch or a tactile type switch. The power switch portion 102 is turned on or off to switch between power supply from the power supply controller 303 and power supply stop.

The reading portion 103 is operated by being supplied with power from the power supply controller 303. The reading portion 103 reads an original disposed on an original base plate to generate image data of a digital image, and outputs the generated image data to an image processing portion 306 of the controller 304.

The print processing portion 104 performs printing on a recording medium such as sheet based on bitmap data input from the image processing portion 306, and conveys the printed recording medium to the post-processing portion 106.

The display panel portion 105 simply displays a lamp or an error code to notify that printing is in progress or that the printer is stopped due to an error.

The post-processing portion 106 optionally performs binding and the like on the recording medium conveyed from the print processing portion 104.

The AC plug 301 is inserted into an external outlet as a power supply plug to supply power from the external outlet to the power supply portion 302.

The power supply portion 302 converts AC power supplied from the AC plug 301 into DC power and supplies the converted power to the power supply controller 303.

The power supply controller 303 starts power supply to the controller 304 when the power switch portion 102 is turned on, and supplies power to the reading portion 103, the print processing portion 104, and the post-processing portion 106 in response to an instruction from a CPU portion 305 of the controller 304.

The power supply controller 303 stops power supply in response to the instruction from the CPU portion 305 when the power switch portion 102 is turned off. Even when the power switch portion 102 is not turned off, the power supply controller 303 stops the power supply in response to the instruction from the CPU portion 305 and turns off the power switch portion 102. Here, a case where the CPU portion 305 gives an instruction to stop the power supply is, for example, a case where an instruction to turn off the power is received from the user via a remote operation device connection portion 307 or a network controller 310.

The controller 304 controls the overall operation of the image forming apparatus 101. Specifically, the controller 304 includes the CPU portion 305, the image processing portion 306, the remote operation device connection portion 307, a RAM portion 308, a storage portion 309, the network controller 310, and a timer 311. It is noted that the number of the CPU portions 305 is not limited to one and may be plural, and at least one CPU portion may be provided.

The CPU portion 305 as a processor portion reads and executes a startup program stored in the storage portion 309 in response to a user instruction input from the network controller 310, thereby controlling the operation of the image forming apparatus 101 while using the RAM portion 308.

In response to a print instruction input from the network controller 310, the CPU portion 305 performs control to cause the image processing portion 306 to execute image processing based on print data input from the network controller 310. The CPU portion 305 functions as an execution portion that executes a setting change, shutdown control processing to be described later, or the like in response to the user instruction input from the network controller 310.

The CPU portion 305 instructs the power supply controller 303 to supply power to the reading portion 103, the print processing portion 104, and the post-processing portion 106. When the power switch portion 102 is turned off, the CPU portion 305 instructs the power supply controller 303 to stop power supply. The CPU portion 305 instructs the power supply controller 303 to stop power supply upon receiving a power off instruction through the user from the remote operation device connection portion 307 or the network controller 310.

The image processing portion 306 performs image processing such as color space conversion on the digital image of the image data input from the reading portion 103, and outputs data after the image processing to the CPU portion 305. The image processing portion 306 performs image processing such as color space conversion based on the data after image processing input from the CPU portion 305 to convert the data into bitmap data, and outputs the bitmap data to the print processing portion 104.

The remote operation device connection portion 307 as a communication portion is wirelessly connected to the remote operation device 201 directly or via the access point 507. The remote operation device connection portion 307 performs wireless communication with the remote operation device 201 to transmit and receive data to and from the remote operation device 201. Here, the data transmitted and received between the remote operation device connection portion 307 and the remote operation device 201 is display image data stored in the storage portion 309, command communication data for control of the image forming apparatus 1, or the like.

The RAM portion 308 is used for temporary data storage.

The storage portion 309 is, for example, a hard disc drive (HDD) or a solid state drive (SSD), and is used to store various data. The storage portion 309 stores a startup program of the image forming apparatus 101, various settings, display image data of an operation screen to be displayed on the remote operation device 201, printing data, or the like.

The network controller 310 is wirelessly connected or connected by wire to a LAN or the like. The network controller 310 receives, via a network such as a LAN, a print instruction or print data to the image forming apparatus 101 transmitted from the remote operation device 201, or a PC and a tablet (not illustrated) located at a remote place. The network controller 310 outputs the received print instruction or print data to the CPU portion 305.

The network controller 310 receives, via a network such as a LAN, a user instruction such as a setting change or shutdown processing of the image forming apparatus 101 transmitted from the remote operation device 201, or a PC and a tablet (not illustrated) located at a remote place. The network controller 310 outputs the received user instruction to the CPU portion 305.

The timer 311 performs counting under the control of the CPU portion 305.

In the image forming apparatus 101 having the above-described configuration, the image data and the command communication are transmitted and received through one communication line, but the present invention is not limited thereto, and the image data and the command communication may be transmitted and received through different communication lines.

Further, the network controller 310 and the remote operation device connection portion 307 may be shared. However, in this case, the image forming apparatus 101 and the remote operation device 201 are connected to each other via a normal network, and communicate the print data, the command communication, and the image data of the screen displayed on the remote operation device 201 through the same path. In this case, since the amount of communication data increases, the response of screen display in the remote operation device 201 is delayed, and it may take time for the image forming apparatus 101 to receive the print data. Therefore, in the image forming apparatus 101, the network controller 310 and the remote operation device connection portion 307 are separately provided.

<Configuration of Remote Operation Device>

Figure 4:
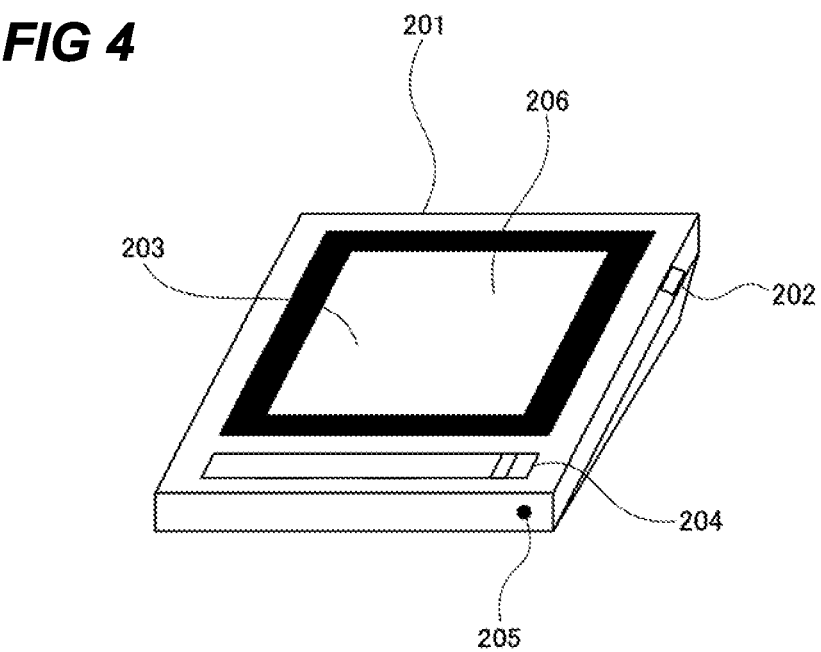
FIG. 4 is a schematic diagram of a remote operation device according to the embodiment of the present invention.
Figure 5:
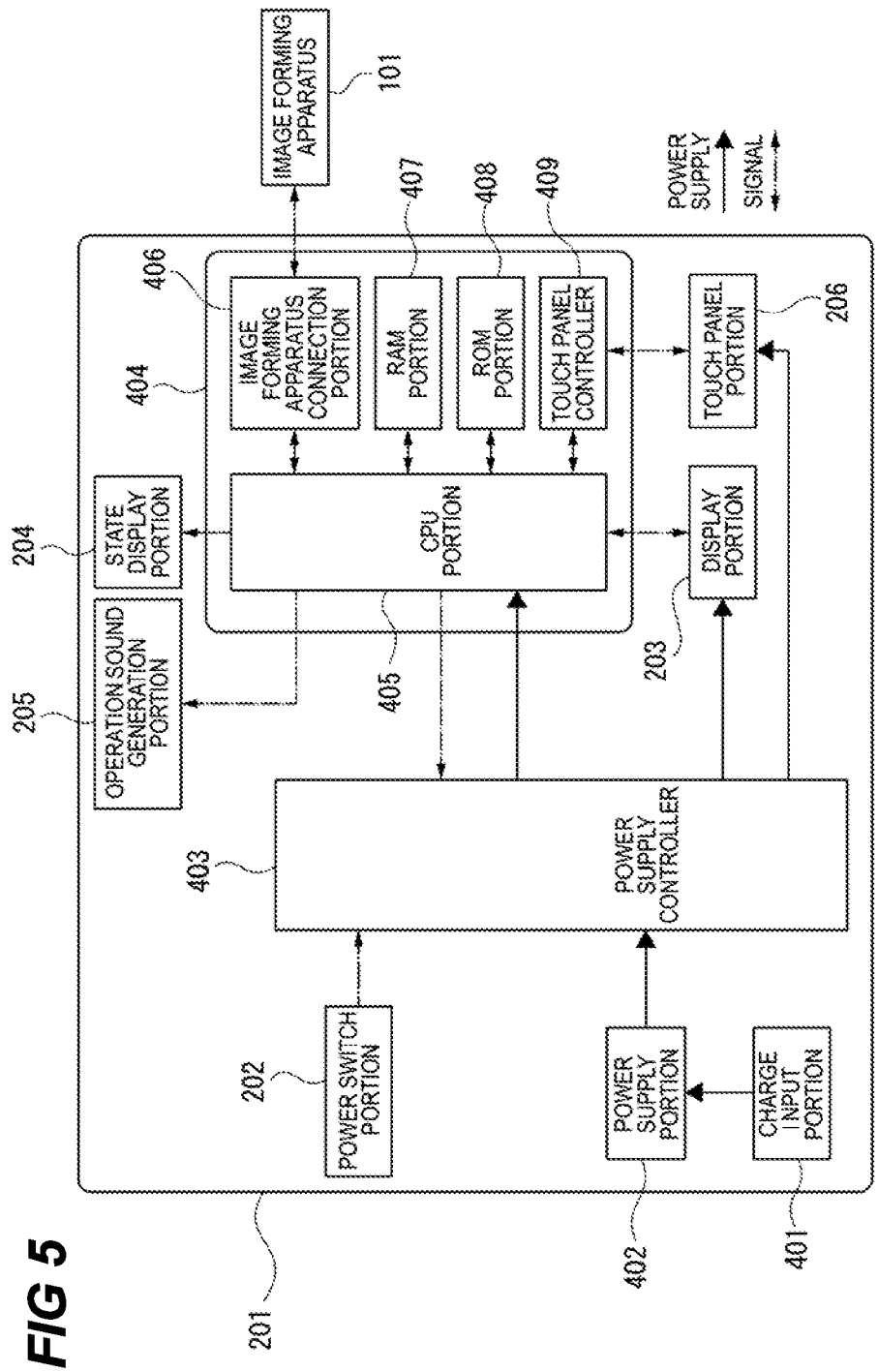
FIG. 5 is a block diagram illustrating a configuration of the remote operation device according to the embodiment of the present invention.

A configuration of the remote operation device 201 connected to the image forming apparatus 101 according to the embodiment of the present invention will be described in detail with reference to FIGS. 4 and 5.

The remote operation device 201 includes a power switch portion 202, a display portion 203, a state display portion 204, an operation sound generation portion 205, a touch panel portion 206, a charge input portion 401, a power supply portion 402, a power supply controller 403, and a controller 404.

The power switch portion 202 turns on or off the remote operation device 201.

The display portion 203 is, for example, an LCD that displays an operation screen under the control of the controller 404.

The state display portion 204 notifies a user of the state of the image forming apparatus 101 or the remote operation device 201 by an LED or the like under the control of the controller 404.

The operation sound generation portion 205 is a speaker or the like that generates a sound in response to the user's operation on the remote operation device 201 under the control of the controller 404.

The touch panel portion 206 has an x-coordinate and a y-coordinate corresponding to the operation screen of the display portion 203. The touch panel portion 206 receives an operation instruction from the user, and outputs coordinate data of the x-coordinate and the y-coordinate to which the operation instruction has been input to a touch panel controller 409 of the controller 404.

The charge input portion 401 is connected to an external charger (not illustrated).

The power supply portion 402 is a battery or the like that accumulates power supplied from the charger via the charge input portion 401.

The power supply controller 403 supplies the power accumulated in the power supply portion 402 to the controller 404. The power supply controller 403 supplies the power accumulated in the power supply portion 402 to the display portion 203, the state display portion 204, the operation sound generation portion 205, and the touch panel portion 206 under the control of a CPU portion 405 of the controller 404.

The controller 404 controls the overall operation of the remote operation device 201. Specifically, the controller 404 includes the CPU portion 405, an image forming apparatus connection portion 406, a RAM portion 407, a ROM portion 408, and the touch panel controller 409.

The CPU portion 405 controls the operation of the remote operation device 201 while using the RAM portion 407 based on a startup program and various types of setting information stored in the ROM portion 408. The CPU portion 405 is connected to the image forming apparatus connection portion 406, the RAM portion 407, the ROM portion 408, and the touch panel controller 409 via an interface (not illustrated).

The CPU portion 405 performs a control operation to switch between the image of the image data stored in the remote operation device 201 and the image of the display image data received via the image forming apparatus connection portion 406, and to display the switched image on the display portion 203. The CPU portion 405 determines a menu selected on the operation screen of the display portion 203 corresponding to the input coordinates input from the touch panel controller 409, and outputs a user instruction in the determined menu to the image forming apparatus connection portion 406.

The image forming apparatus connection portion 406 is directly wirelessly connected to the image forming apparatus 101 or wirelessly connected thereto via the access point 507. The image forming apparatus connection portion 406 performs wireless communication with the image forming apparatus 101 to transmit and receive data to and from the image forming apparatus 101. Here, data transmitted and received between the image forming apparatus connection portion 406 and the image forming apparatus 101 is display image data stored in the storage portion 309 and command communication data for control of the image forming apparatus 1. In addition, data or an instruction transmitted and received between the image forming apparatus connection portion 406 and the image forming apparatus 101 is a print instruction or print data to the image forming apparatus 101, a user instruction such as a setting change or shutdown processing of the image forming apparatus 101, or the like.

The RAM portion 407 stores temporary data and the like associated with the execution of the program by the CPU portion 405. The RAM portion 407 is used for temporarily storing data such as display image data of an operation image to be displayed on the display portion 203 received from the image forming apparatus 101.

The ROM portion 408 stores data such as a startup program of the remote operation device 201 and various setting information.

The touch panel controller 409 specifies input coordinates based on the coordinate data input from the touch panel portion 206, and outputs the specified input coordinates to the CPU portion 405.

In the remote operation device 201 having the above configuration, the CPU portion 405 switches the image to be displayed on the display portion 203, but the present invention is not limited thereto, and a selector of an output image provided outside the remote operation device 201 may switch the image to be displayed on the display portion 203.

<Shutdown Control Processing>

The shutdown control processing executed by the image forming apparatus 101 according to the embodiment of the present invention will be described in detail with reference to FIGS. 6 and 9 to 11.

Here, FIGS. 9 and 10 are operation screens displayed on the display portion 203 of the remote operation device 201 serving as a shutdown instruction source, and FIG. 11 is an operation screen displayed on the display portion 203 of the remote operation device 201 serving as an inquiry destination of the shutdown processing.

Figure 9A:
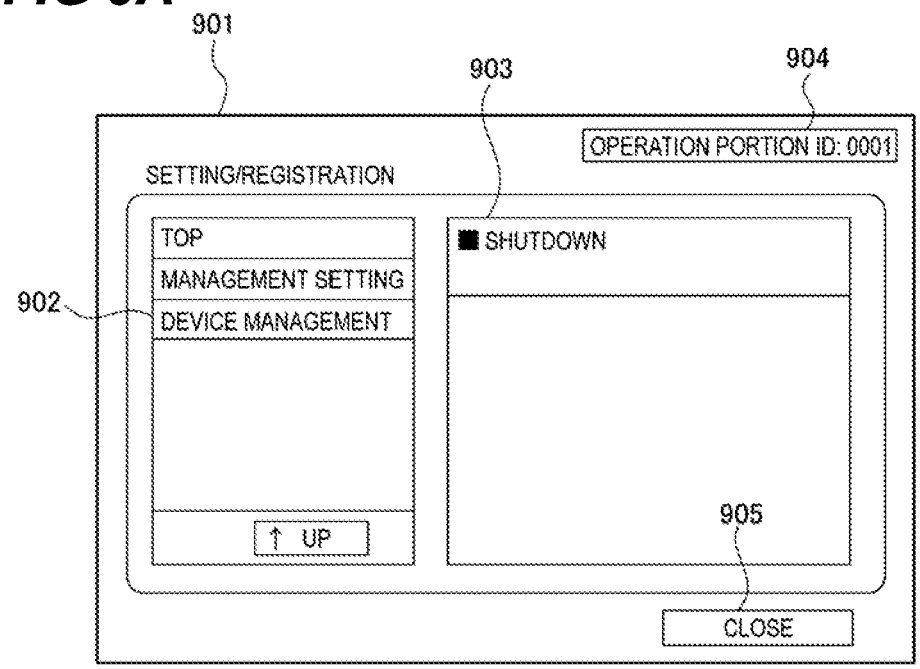
FIGS. 9A and 9B are diagrams illustrating an example of a display when a shutdown instruction is displayed on a touch panel portion of the remote operation device connected to the image forming apparatus according to the embodiment of the present invention.
Figure 9B:
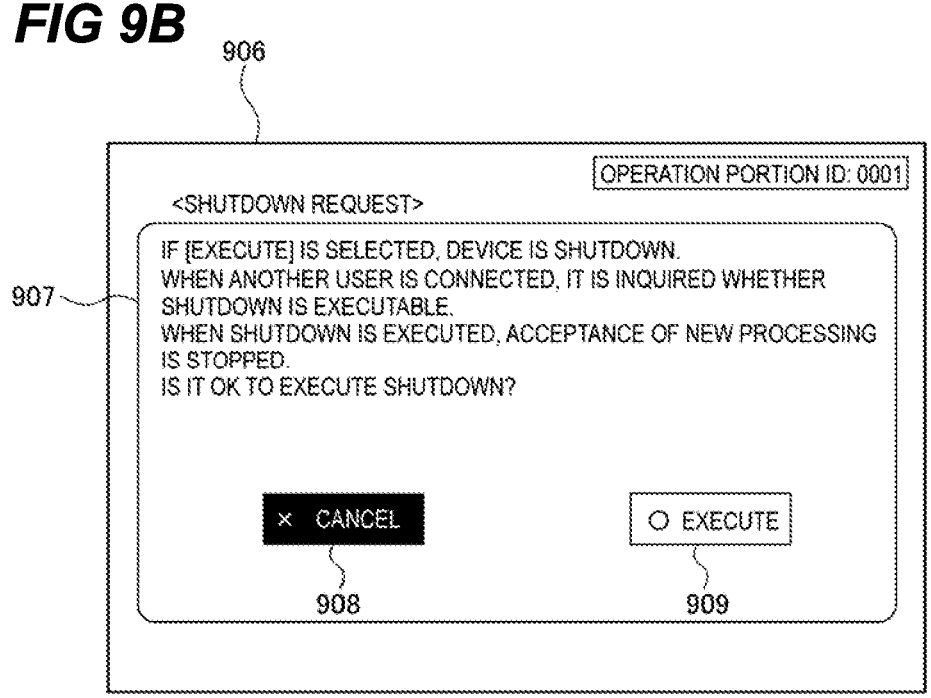

In FIG. 9, FIG. 9A illustrates a setting/registration operation screen for transmitting a shutdown instruction, and FIG. 9B illustrates an operation screen of a shutdown processing execution request.

Figure 10A:
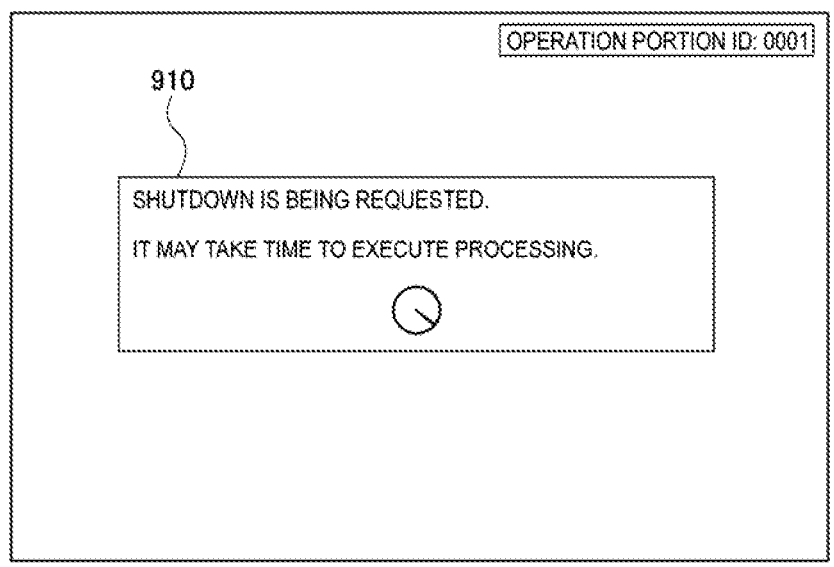
FIGS. 10A and 10B are diagrams illustrating an example of a display when a shutdown instruction is displayed and a shutdown instruction result is displayed on the touch panel portion of the remote operation device connected to the image forming apparatus according to the embodiment of the present invention.
Figure 10B:
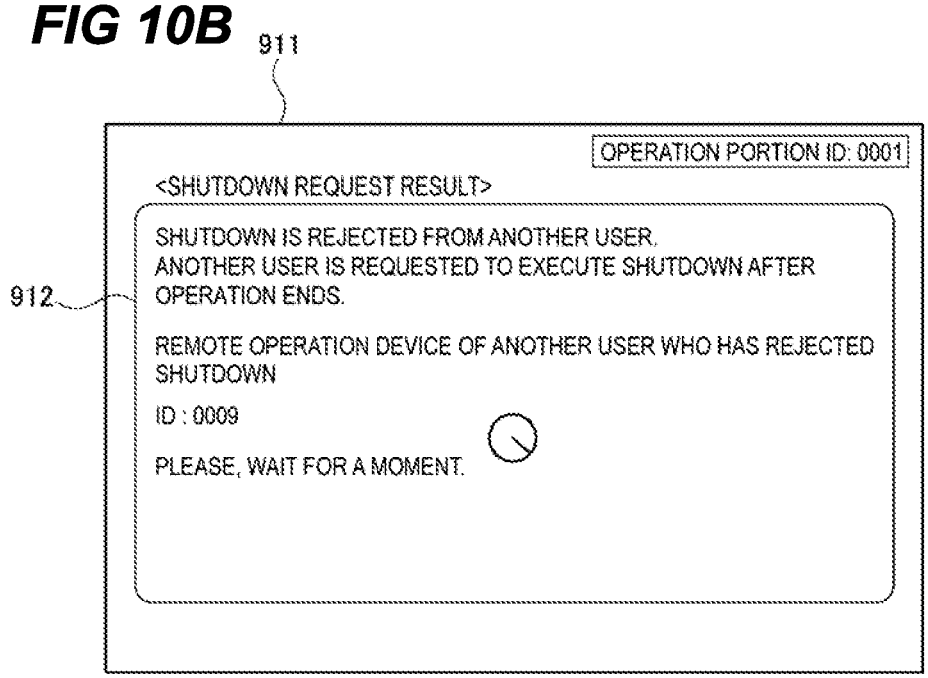

In FIG. 10, FIG. 10A illustrates an execution request transmission screen of the shutdown processing, and FIG. 10B illustrates an operation screen of a shutdown instruction result notification.

Figure 11A:
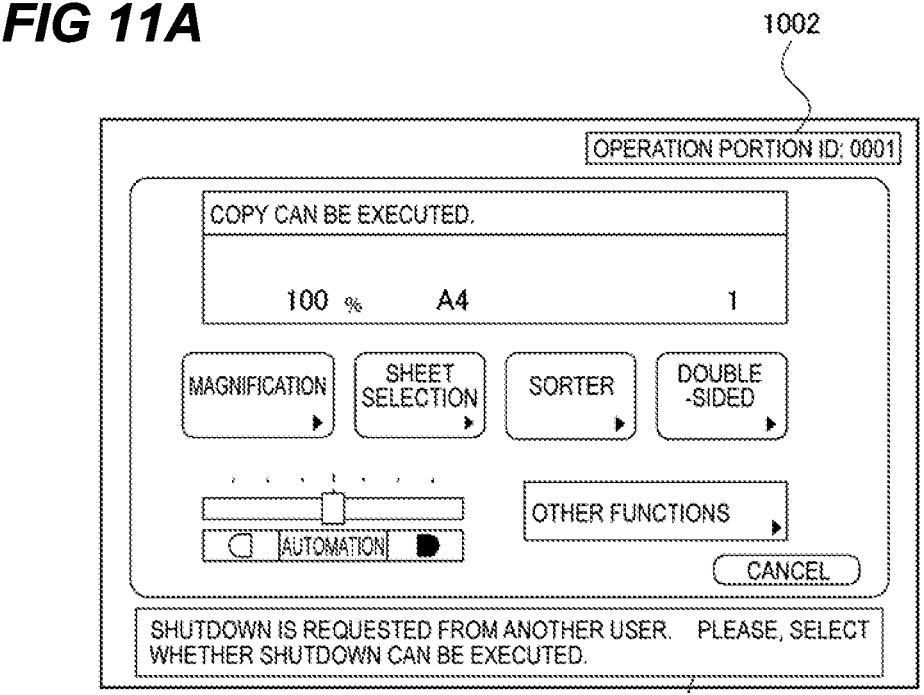
FIGS. 11A and 11B are diagrams illustrating an example of a display before execution of the shutdown processing displayed on the touch panel portion of the remote operation device connected to the image forming apparatus according to the embodiment of the present invention.
Figure 11B:
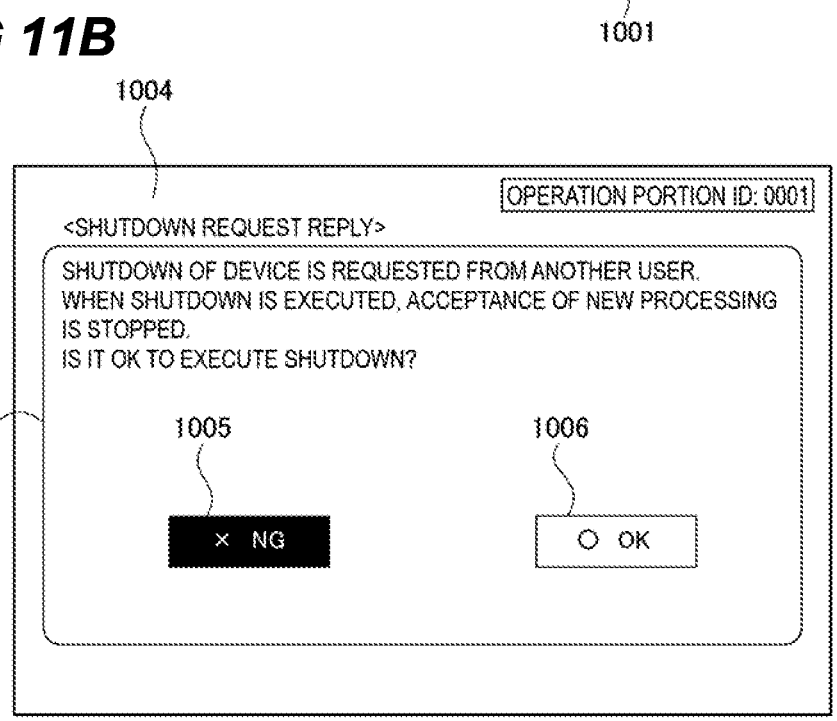

In FIG. 11, FIG. 11A illustrates an operation screen on which a shutdown permission notification is received, and FIG. 11B illustrates an operation screen of a reply to the shutdown permission notification.

Figure 6:
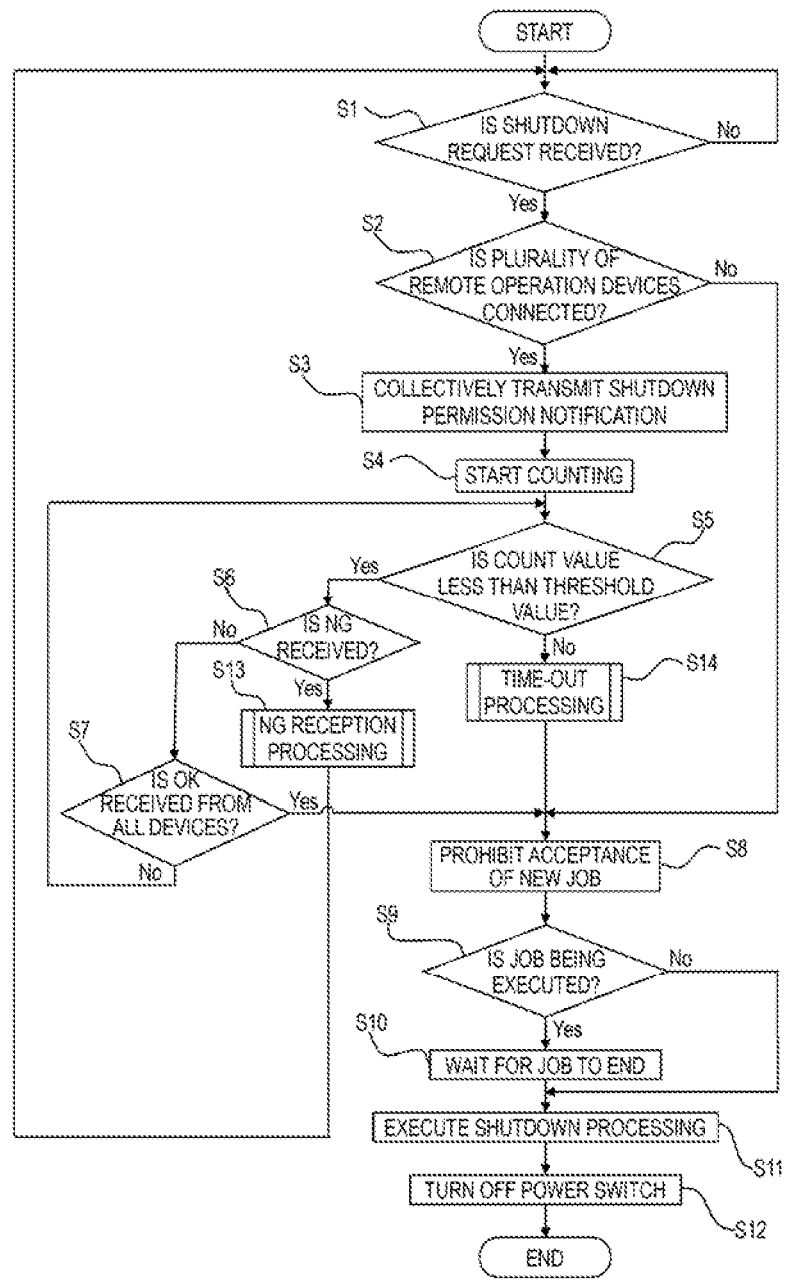
FIG. 6 is a flowchart illustrating shutdown processing executed by the image forming apparatus according to the embodiment of the present invention.

The shutdown control processing illustrated in FIG. 6 is assumed to be executed by the image forming system 100a or the image forming system 100b in which a plurality of remote operation devices 201 is connected to one image forming apparatus 101 as illustrated in FIG. 1.

In addition, the shutdown control processing illustrated in FIG. 6 is started at a timing when power is supplied to the CPU portion 305 and the like by the power supply controller 303 of the image forming apparatus 101. Further, each step of the shutdown processing is realized by the CPU portion 305 executing a program stored in the storage portion 309.

In parallel with the shutdown control processing illustrated in FIG. 6, first, the image forming apparatus 101 performs control so that the CPU portion 305 reads display image data stored in the storage portion 309 and causes the remote operation device connection portion 307 to transmit the read display image data to the remote operation device 201. The remote operation device 201 receives the display image data transmitted from the remote operation device connection portion 307 by the image forming apparatus connection portion 406. Then, the remote operation device 201 causes the display portion 203 to display the operation image of the display image data received by the image forming apparatus connection portion 406 under the control of the CPU portion 405.

As a result, the display portion 203 displays the setting/registration operation screen for transmitting the shutdown instruction illustrated in FIG. 9A. On the setting/registration operation screen for transmitting the shutdown instruction, a title 901 of the setting/registration operation screen is displayed as "setting/registration". An operation portion ID window 904 displays an ID number for identifying the remote operation device 201.

A close button 905 is a button selected by a user when closing the displayed setting/registration operation screen for transmitting the shutdown instruction. A hierarchy window 902 indicating hierarchy of a setting/registration menu notifies the user of information on currently selected hierarchy on the setting/registration menu in the image forming apparatus 101.

A detailed menu display window 903 displays a list of detailed menus selectable by the user in the current menu hierarchy. The detailed menu display window 903 includes a shutdown instruction. Therefore, the shutdown instruction can be executed on the setting/registration operation screen for transmitting the shutdown instruction.

The setting/registration operation screen for transmitting the above-described shutdown request transitions when a setting value, a power state, or the like of the image forming apparatus 101 is changed.

When the user selects shutdown in the detailed menu display window 903 on the setting/registration operation screen for transmitting the shutdown instruction, the operation screen of the shutdown processing execution request illustrated in FIG. 9B is displayed on the display portion 203.

On the operation screen of the shutdown processing execution request, a title 906 is displayed as a "shutdown instruction". A detailed content display window 907 displays processing contents and cautions of the shutdown instruction. When the user touches a cancel button 908, the shutdown processing is canceled without being executed. When the user touches an execution button 909, the shutdown instruction, which is the shutdown processing execution request, can be transmitted from the remote operation device 201 to the image forming apparatus 101.

After transmitting the execution request of the shutdown processing, the display portion 203 displays the execution request transmission screen of the shutdown processing illustrated in FIG. 10A. In the execution request transmission screen of the shutdown processing, a detailed content display window 910 displays that the shutdown instruction is being transmitted.

In parallel with the above processing, in FIG. 6, first, the CPU portion 305 determines whether the remote operation device connection portion 307 receives a shutdown instruction, which is an instruction to shut down the image forming apparatus 101, from the remote operation device 201 (S1).

When the shutdown instruction is not received (step S1: No), the CPU portion 305 repeats the processing of step S1.

On the other hand, upon receiving the shutdown instruction (step S1: Yes), the CPU portion 305 determines whether a plurality of remote operation devices 201 is connected (S2).

Upon determining that the plurality of remote operation devices 201 is connected (step S2: Yes), the CPU portion 305 causes the remote operation device connection portion 307 to transmit a shutdown inquiry notification to the remote operation device 201 other than the remote operation device 201 that has transmitted the shutdown instruction. Here, the shutdown inquiry notification is a notification of inquiring whether to shut down the image forming apparatus 101. In addition, the CPU portion 305 causes a shutdown permission notification to be collectively transmitted to the remote operation device 201 other than the remote operation device 201 that has transmitted the shutdown instruction. The shutdown permission notification is transmitted from the remote operation device connection portion 307 (S3). As a result, the display portion 203 of the remote operation device 201 displays an operation screen on which the shutdown permission notification illustrated in FIG. 11A is received.

Here, on the operation screen on which the shutdown permission notification is received, an operation portion ID window 1002 displays an ID number for identifying the remote operation device 201. A status window 1001 displays notification information and the like received by the remote operation device 201. The operation screen on which the shutdown permission notification illustrated in FIG. 11A is received indicates that the shutdown permission notification is received in the status window 1001.

In addition, the display portion 203 displays an operation screen of a reply to the shutdown permission notification illustrated in FIG. 11B when the user touches the status window 1001 on the operation screen on which the shutdown permission notification is received. On the operation screen of the reply to the shutdown permission notification, a title 1004 is displayed as <shutdown instruction reply>. A detailed content display window 1003 displays reply contents and cautions of the shutdown instruction.

Referring back to FIG. 6, next, the CPU portion 305 of the image forming apparatus 101 starts counting by the timer 311 (S4). The reason for counting by the timer 311 is to enable shutdown to be executed even when the remote operation device 201 is connected to the remote operation device connection portion 307 but is not operated by the user.

Next, the CPU portion 305 determines whether a count value of the timer 311 is less than a threshold value (S5). The threshold value to be compared with the count value of the timer 311 is variable and can be changed by the user.

When the count value of the timer 311 is less than the threshold value (step S5: Yes), the CPU portion 305 checks the reply status of the shutdown permission notification in the remote operation device connection portion 307. First, the CPU portion 305 determines whether rejection is included in the reply to the shutdown permission notification (whether NG is received) (S6). Here, the rejection means rejecting the shutdown instruction received in the processing of step S1.

In a case where the reply does not include the rejection (step S6: No), the CPU portion 305 determines whether all the replies to the shutdown permission notification which has been collectively transmitted are permitted (OK is received from all the devices) (S7). Here, permission means permitting the shutdown instruction received in the processing of step S1.

In a case where not all the replies are permission (step S7: No), the CPU portion 305 returns to the processing of step S5. The case of returning to step S5 is a case where not all the replies from the remote operation device 201 have been received and the replies that have been received so far do not include a rejection.

On the other hand, in a case where all the replies are permission (step S7: Yes), the CPU portion 305 prohibits acceptance of a new job with respect to the image forming apparatus 101 (S8). Here, the case where all the replies are permitted is a case where an OK button 1006 is selected on the operation screen of the reply to the shutdown permission notification illustrated in FIG. 11B of all the remote operation devices 201 that have received the shutdown permission notification that has been collectively transmitted. In this case, the CPU portion 305 can permit the shutdown instruction.

Next, the CPU portion 305 determines whether the image forming apparatus 101 is executing a job (S9).

When the job is being executed (step S9: Yes), the CPU portion 305 waits for the job being executed to end (S10).

Next, the CPU portion 305 executes shutdown processing (S11). The shutdown processing includes exhaust processing of ozone or the like accumulated in the print processing portion 104, termination processing of a program such as an OS or the like.

Next, the CPU portion 305 stops the supply of power from the power supply controller 303 and turns off the power switch portion 102 (S12), and then ends the shutdown control processing.

On the other hand, upon determining in step S2 that the single remote operation device 201 is connected (step S2: No), the CPU portion 305 skips to the processing of step S8.

In addition, in step S5, in a case where the count value of the timer 311 is equal to or greater than the threshold value (step S5: No), the CPU portion 305 executes time-out processing (S14), and then returns to the processing of step S8. As described above, the time-out processing is executed if all the received replies permit shutdown in a case where not all the replies to the shutdown permission notification have been received within a predetermined time. The time-out processing will be described later.

Furthermore, in step S6, in a case where it is determined that the reply includes rejection (step S6: Yes), the CPU portion 305 executes NG reception processing (S13). Then, the CPU portion 305 returns to step S1 and waits for the shutdown instruction from the connected remote operation device 201 to be received again. It is noted that the NG reception processing will be described later.

The case where the reply includes rejection is a case where at least one of all the remote operation devices 201 that have received the shutdown permission notification selects the NG button 1005 on the operation screen of the reply to the shutdown permission notification illustrated in FIG. 11B. In this case, the CPU portion 305 can reject the shutdown instruction.

Furthermore, in step S9, in a case where a job is not being executed (step S9: No), the CPU portion 305 skips the processing in step S10 and executes the processing in step S11.

As described above, in the above-described shutdown control processing, predetermined processing is executed from a timing at which the image forming apparatus 101 receives the shutdown instruction transmitted from one remote operation device 201 until the image forming apparatus 101 turns off the power switch portion 102.

<NG Reception Processing>

The NG reception processing executed by the image forming apparatus 101 according to the embodiment of the present invention will be described in detail with reference to FIGS. 7, 10, and 12.

Figure 12A:
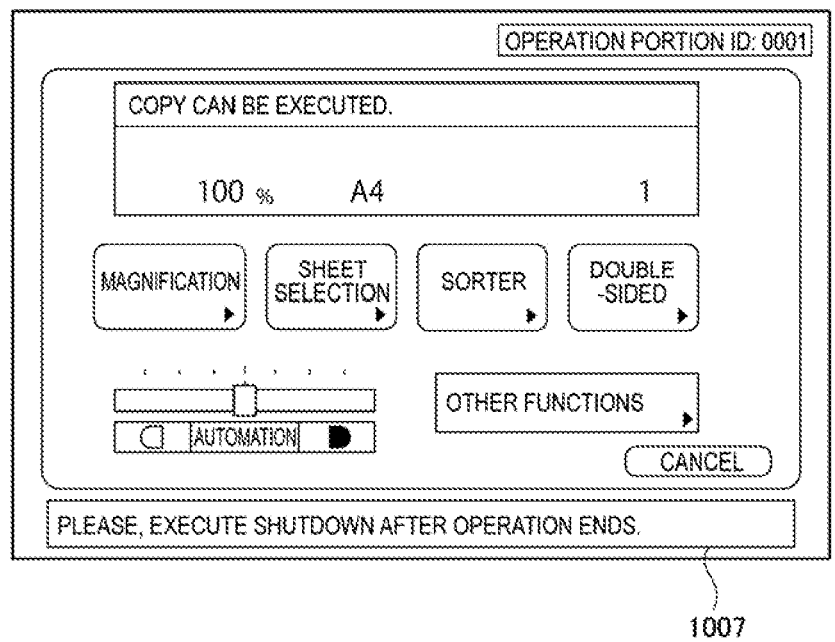
FIGS. 12A and 12B are diagrams illustrating an example of a display at the time of execution of the shutdown processing displayed on the touch panel portion of the remote operation device connected to the image forming apparatus according to the embodiment of the present invention.
Figure 12B:
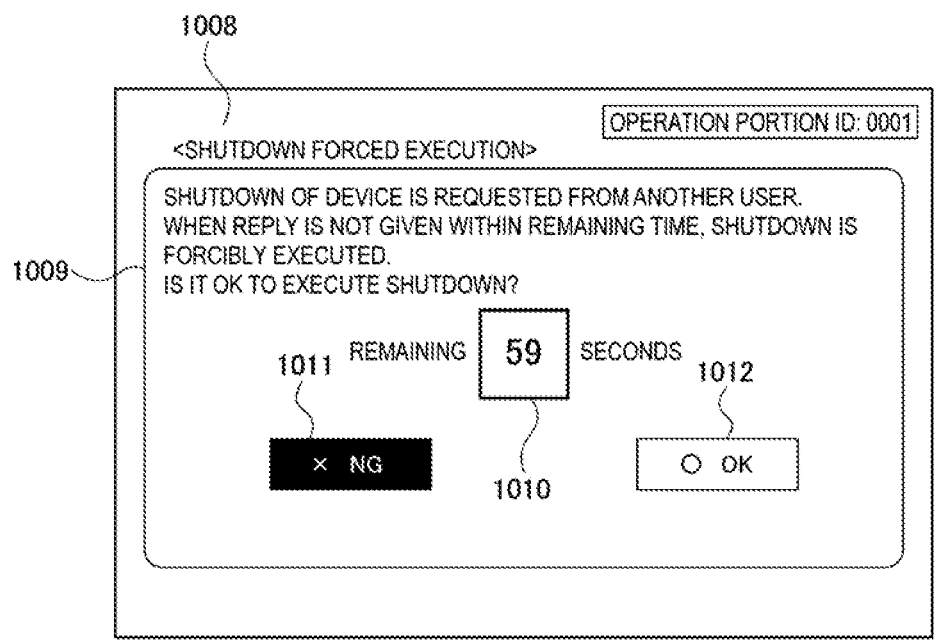

In FIG. 12, FIG. 12A illustrates an operation screen on which a shutdown execution notification is received, and FIG. 12B illustrates an operation screen of a shutdown forced execution notification.

Figure 7:
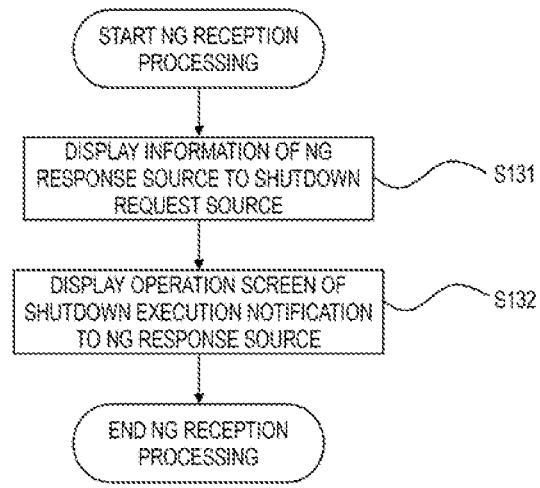
FIG. 7 is a flowchart illustrating NG reception processing executed by the image forming apparatus according to the embodiment of the present invention.

The NG reception processing illustrated in FIG. 7 is started at a timing when it is determined that the reply includes rejection in the processing of step S6 of the shutdown control processing illustrated in FIG. 6 (step S6: Yes).

First, the CPU portion 305 transmits a shutdown instruction result notification to the remote operation device 201 that has transmitted the shutdown instruction (S131). As a result, the display portion 203 of the remote operation device 201 displays the operation screen of the shutdown instruction result notification illustrated in FIG. 10B to notify that the shutdown instruction has been rejected.

Here, on the operation screen of the shutdown instruction result notification, a title 911 is displayed as a "shutdown instruction result". A detailed content display window 912 displays information such as information indicating that the shutdown instruction has been rejected and the operation portion ID of the remote operation device 201 that has rejected the shutdown instruction. In the case of the operation screen of the shutdown instruction result notification illustrated in FIG. 10B, the detailed content display window 912 indicates that the remote operation device 201 having the operation portion ID of 0009 rejects the shutdown instruction.

Next, the CPU portion 305 transmits a shutdown execution notification to the remote operation device 201 that has responded with the rejection to the shutdown permission notification. As a result, the CPU portion 305 causes the display portion 203 of the remote operation device 201 to display the operation screen on which the shutdown execution notification illustrated in FIG. 12A has been received (S132). Then, the CPU portion 305 ends the NG reception processing and returns to the processing of step S1 of the shutdown control processing illustrated in FIG. 6.

Here, on the operation screen on which the shutdown execution notification has been received, a status window 1007 displays notification information or the like received by the remote operation device 201, and displays detailed information or the like by being touched by the user.

On the operation screen having received the shutdown execution notification illustrated in FIG. 12A, reception of the shutdown execution notification is displayed in the status window 1007. When the user touches the status window 1007, the operation screen of the shutdown processing execution request illustrated in FIG. 9B is displayed on the display portion 203. As a result, it is possible to urge the user who has responded with the rejection on the operation screen of the reply to the shutdown permission notification to transmit the shutdown instruction after the end of the operation.

As described above, in the NG reception processing, predetermined processing is executed from the reception of the reply including the rejection notification in response to the shutdown permission notification until the reception of the shutdown instruction from the remote operation device 201 again.

<Time-Out Processing>

The time-out processing executed by the image forming apparatus 101 according to the embodiment of the present invention will be described in detail with reference to FIG. 8.

Figure 8:
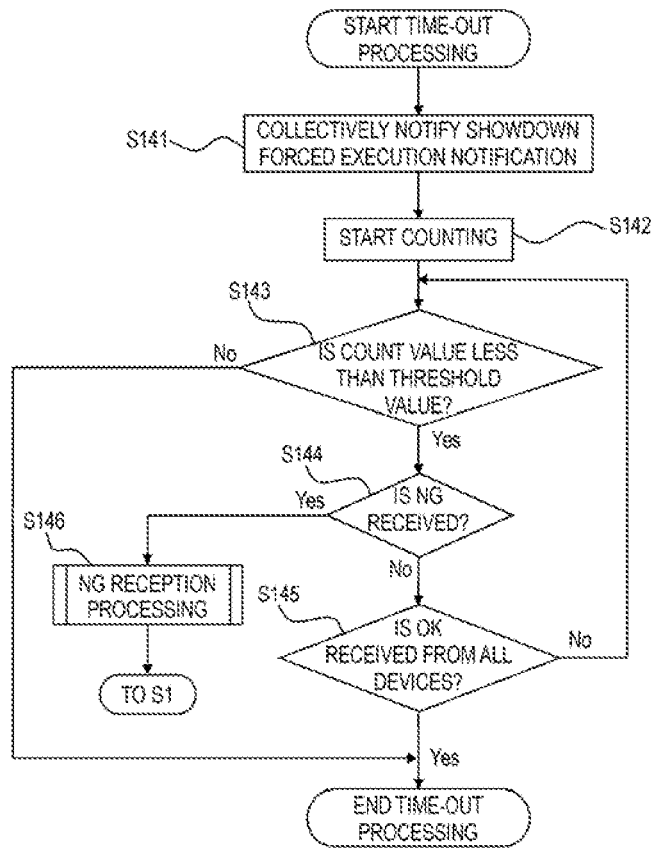
FIG. 8 is a flowchart illustrating time-out processing executed by the image forming apparatus according to the embodiment of the present invention.

The time-out processing illustrated in FIG. 8 is started at a timing when it is determined in the processing of step S5 of the shutdown control processing illustrated in FIG. 6 that the count value of the timer 311 is equal to or greater than the threshold value (step S5: No).

First, the CPU portion 305 collectively transmits a shutdown forced execution notification to the remote operation device 201 from which the reply to the shutdown permission notification cannot be received (S141). As a result, the display portion 203 of the remote operation device 201 that has received the shutdown forced execution notification displays the operation screen of the shutdown forced execution notification illustrated in FIG. 12B.

Here, on the operation screen of the shutdown forced execution notification, a title 1008 is displayed as shutdown forced execution. A detailed content display window 1009 displays that the shutdown processing is forcibly executed after a certain period of time. A remaining time window 1010 displays the remaining time of the timer. The user can reject execution of the shutdown processing by selecting an NG button 1011. When the user selects an OK button 1012, execution of the shutdown processing can be permitted.

Next, the CPU portion 305 starts counting by the timer 311 (S142). The timer 311 is used to forcibly execute the shutdown processing even when there is no reply within a certain period of time.

Next, the CPU portion 305 determines whether the timer value of the timer 311 is less than the threshold value (S143). The threshold value to be compared with the timer value of the timer 311 is variable and can be changed by the user.

In a case where the timer value of the timer 311 is less than the threshold value (step S143: Yes), the CPU portion 305 checks the reply status with respect to the shutdown forced execution notification. First, the CPU portion 305 determines whether a reply to the shutdown forced execution notification includes rejection (whether NG is received) (S144).

In a case where the reply to the shutdown forced execution notification does not include rejection (step S144: No), the CPU portion 305 determines whether all the replies to the transmitted shutdown forced execution notification are permission (OK is received from all the devices) (S145).

In a case where all the replies to the shutdown forced execution notification which has been collectively transmitted are permission (step S145: Yes), the CPU portion 305 ends the time-out processing. Then, in order to forcibly start the shutdown processing of the image forming apparatus 101, the CPU portion 305 proceeds to the processing of step S8 of the shutdown control processing illustrated in FIG. 6. In this case, the condition for forcibly starting the shutdown processing is that all the replies to a notification indicating that the shutdown processing is forcibly executed permit the shutdown.

On the other hand, in a case where the timer value of the timer 311 is equal to or greater than the threshold value in step S143 (step S143: No), the CPU portion 305 ends the time-out processing. Then, in order to forcibly start the shutdown processing of the image forming apparatus 101, the CPU portion 305 proceeds to the processing of step S8 of the shutdown control processing illustrated in FIG. 6. In this case, the condition for forcibly starting the shutdown processing is not to receive all the replies to a notification indicating that the shutdown processing is forcibly executed within a predetermined time after the notification indicating that the shutdown processing is forcibly executed.

When the reply to the shutdown forced execution notification includes rejection in the processing of step S144 (step S143: Yes), the CPU portion 305 executes the NG reception processing (S146). Then, the CPU portion 305 returns to the processing of step S1 of the shutdown control processing illustrated in FIG. 6.

In addition, in step S145, in a case where not all the replies to the shutdown forced execution notification collectively transmitted are permission (step S145: No), the CPU portion 305 returns to the processing of step S143. The case of returning to the processing of step S143 is a case where not all the replies to the shutdown forced execution notification have been received, and rejection is not included in the received reply.

As described above, when a shutdown instruction is received from some of the remote operation devices 201 being connected, a shutdown permission notification is collectively transmitted to the remote operation devices 201 being connected. In addition, when a reply to the shutdown permission notification is received and all the received replies permit the shutdown, the shutdown processing is executed. As a result, in the image forming apparatus 101 that can be remotely operated by the plurality of remote operation devices 201, it is possible to prevent the image forming apparatus 101 from being shut down by another remote operation device 201 during the use of the image forming apparatus 101.

In the embodiment, when the remote operation device connection portion 307 receives the shutdown instruction from the remote operation device 201, the shutdown permission notification is transmitted to the remote operation devices 201 other than the remote operation device 201 that has transmitted the shutdown instruction. The remote operation device connection portion 307 also receives a reply to the shutdown permission notification. Further, the CPU portion 305 executes the shutdown processing when all the received replies to all the shutdown permission notifications permit the shutdown.

As a result, in the image forming apparatus 101 that can be remotely operated by the plurality of remote operation devices 201, it is possible to prevent the image forming apparatus 101 from being shut down by another remote operation device 201 during the use of the image forming apparatus 101.

It goes without saying that the present invention is not limited to the above-described embodiments, and various modifications can be made without departing from the gist of the present invention.

Specifically, in the above-described embodiments, the time-out processing is executed in the shutdown control processing, but the present invention is not limited thereto, and the time-out processing may not be executed. In this case, when the count value of the timer 311 is equal to or greater than the threshold value in step S5, the CPU portion 305 subsequently executes the processing of step S8.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-020676, filed Feb. 14, 2022, which is hereby incorporated by reference herein in its entirety.

What is claimed is:

1. An image forming apparatus wirelessly communicable to a plurality of remote operation devices configured to remotely perform an operation related to execution of image formation, the image forming apparatus comprising:
   a wireless communication interface configured to wirelessly communicate with the plurality of remote operation devices; and
   at least one processor configured to, in a state where the plurality of remote operation devices are wirelessly connected to use the image forming apparatus and in a state where a shutdown instruction to shut down the image forming apparatus is received from at least one remote operation device, among the plurality of remote operation devices;
      transmit a shutdown inquiry notification of inquiring whether shutdown of the image forming apparatus is executable to any other remote operation device, among the plurality of remote operation devices, other than the at least one remote operation device;
      receive a reply to the shutdown inquiry notification from the any other remote operation device; and
      not shut down the image forming apparatus, in a state where the received reply from the any other apparatus does not permit the shutdown of the image forming apparatus.

2. The image forming apparatus according to claim 1, wherein the at least one processor shuts down the image forming apparatus, in a state where all replies from all other remote operation devices, among the plurality of remote operation devices, other than the at least one remote operation device, are replies permitting the shutdown of the image forming apparatus.

3. The image forming apparatus according to claim 1, wherein the at least one processor transmits, in the state where the received reply from the any other remote operating device does not permit the shutdown of the image forming apparatus, information indicating that the shutdown instruction has been rejected to the at least one remote operation device.

4. The image forming apparatus according to claim 1, wherein the at least one processor requests, in the state where the received reply from the any other remote operating device does not permit the shutdown of the image forming apparatus, the at least one remote operation device to transmit the shutdown instruction after the operation is completed.

5. The image forming apparatus according to claim 1, wherein the at least one processor does not shut down the image forming apparatus and waits to receive the shutdown instruction again from the at least one remote operation device, in the state where the received reply from the any other remote operating device does not permit the shutdown of the image forming apparatus.

6. The image forming apparatus according to claim 1, wherein the at least one processor:
   transmits the shutdown inquiry notification of inquiring whether the shutdown of the image forming apparatus is executable to the any other remote operation device; and
   shuts down the image forming apparatus, in a state where no reply to the shutdown inquiry notification is received within a predetermined time from the any other remote operating device.

7. The image forming apparatus according to claim 6, wherein the at least one processor:
   transmits information on the shutdown of the image forming apparatus to any remote operation device, among the any other remote operation device, that has not transmitted a reply to the shutdown inquiry notification within the predetermined time; and
   shuts down the image forming apparatus.

* * * * *